Figure 1:
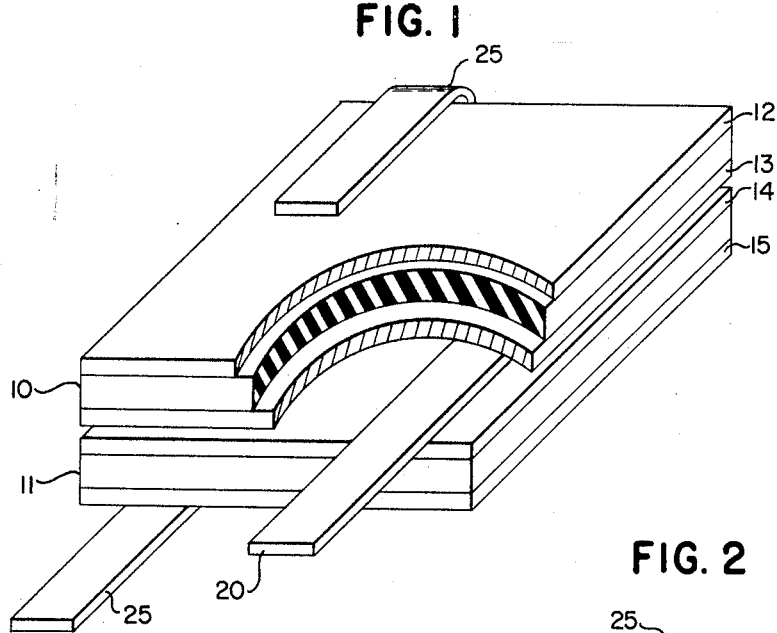

March 1, 1966       K. F. BORNHORST       3,238,429

DUAL BY-PASS CAPACITOR UNIT

Filed April 10, 1964

INVENTOR
KENNETH F. BORNHORST

BY
HIS ATTORNEYS

United States Patent Office 3,238,429
Patented Mar. 1, 1966

3,238,429
DUAL BY-PASS CAPACITOR UNIT
Kenneth F. Bornhorst, Dayton, Ohio, assignor to National Cash Register Company, Dayton, Ohio, a corporation of Maryland
Filed Apr. 10, 1964, Ser. No. 358,780
1 Claim. (Cl. 317—261)

The present invention relates to capacitor units and, more specifically, to capacitor units of the dual by-pass type.

To isolate alternating current signal energy from the direct current supply potential circuitry in electronic wave translating devices, alternating current by-pass capacitors are generally employed. Capacitors of this type should present substantially infinite impedance to direct current signals and a minimum possible impedance to alternating current signal energy.

Since by-pass capacitors are intended to translate alternating current signal energy, their resistance and inductive reactance become important factors to be considered. The equivalent circuit of a by-pass capacitor at high frequencies is an inductance in series with a resistance, the capacitive reactance being negligible. The inductive reactance is created by the leads of the capacitor unit and the resistance by the losses within the dielectric. As the frequency of the signal energy becomes higher, these factors become increasingly significant.

As is well known in the capacitor art, dielectric materials are generally characterized by their dielectric constant $k$, which is an expression of the dielectric or energy-storing capability characteristic of the material compared with air, which has been given an arbitrary value of 1 as a dielectric constant, and the figure of merit or Q factor, which is an expression of the quality or loss of the dielectric material and is the ratio of the energy stored to the energy dissipated in heat within the dielectric for equal intervals of time.

The rate at which heat is generated in a dielectric is proportional to its loss factor, which is equal to the product of its dielectric constant by its power factor. The Q factor of a dielectric material is inversely proportional to the dielectric constant $k$ of that material. Generally, materials having a high dielectric constant have a low Q factor, and materials having a low dielectric constant have a high Q factor.

The capacitance value of a capacitor unit is determined by the total area and thickness of the dielectric material and by its dielectric constant. For a given area and thickness of dielectric, capacitor units of different capacitance value may be produced by the use of dielectric materials having different dielectric constants, the higher the dielectric constant the higher the capacitance value. As the capacitive reactance of a capacitor unit is inversely proportional to the frequency, at lower signal frequencies the capacitance value is the most significant factor in determining the capacitive reactance of a given capacitor unit but becomes increasingly less significant as signal frequencies increase.

Since the figure of merit, or Q factor, is inversely proportional to the energy dissipated in heat within the dielectric for equal intervals of time, signal frequency becomes quite significant in this regard, a high Q factor being mandatory at high signal frequencies.

In circuits in which the signal frequency is in the order of 200 megacycles or higher, it is desirable that the lower frequencies be also by-passed around the direct current supply. If this is not done, parasitic oscillation paths may exist within the translating circuitry, thereby effectively reducing or destroying its effectiveness.

To obtain efficient by-passing, high Q materials are necessary at high signal frequencies, to reduce the dielectric losses, while high dielectric constant materials are necessary at the lower signal frequencies to provide an effective low impedance by-passing with small physical size capacitor units. As both these characteristics are not obtainable in the same dielectric material, prior-art by-pass capacitor units have employed dielectric materials which were a compromise between these two characteristics but did not provide optimum factors for both.

It is, therefore, an object of this invention to provide an improved dual by-pass capacitor unit.

It is another object of this invention to provide an improved dual by-pass capacitor unit having dielectric materials with optimum $k$ and $Q$ characteristics for high and low signal frequencies.

In accordance with the present invention, a dual by-pass capacitor unit is provided wherein first and second members of dielectric material, each coated with a conductive film over both plane surfaces thereof, are placed in a stacked relationship with one electrical conductor extending between and electrically connected to the adjacent plane surfaces of both members and a second electrical conductor electrically connected to the opposite plane surfaces of both members.

Figure 3:
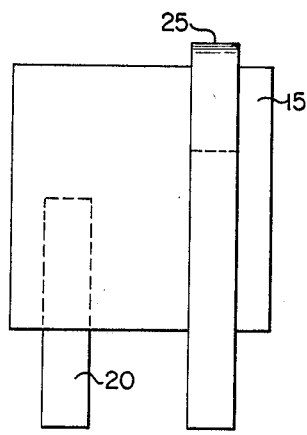
Figure 2:
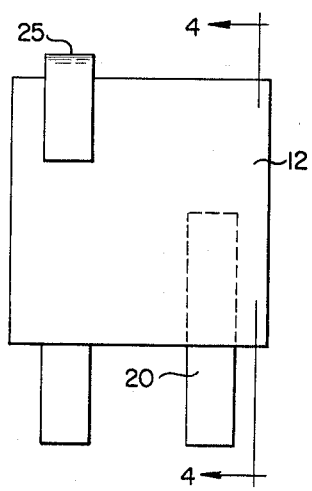
Figure 4:
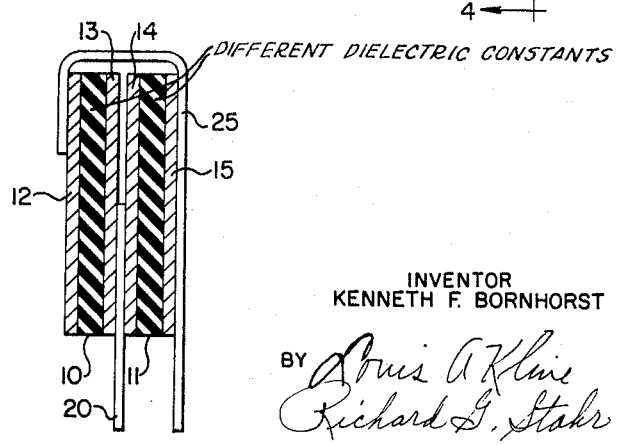

For a better understanding of the present invention, together with further objects, advantages, and features thereof, reference is made to the following description and accompanying drawings, in which:

FIGURE 1 is a perspective view, partly in section, of the dual by-pass capacitor device of this invention,
FIGURE 2 is a top view of FIGURE 1,
FIGURE 3 is a bottom view of FIGURE 1, and
FIGURE 4 is a section view taken along line 4—4 of FIGURE 3 and looking in the direction of the arrows.

Referring to FIGURE 1, there are shown two members of dielectric material 10 and 11, each having two plane surfaces bounded by an edge surface about the perimeter. While the dielectric members have been indicated to be rectangular in form in FIGURE 1, it is to be specifically understood that other geometrical shapes, such as circles or ellipses, may be used without departing from the spirit of the invention. In fact, small capacitors of this type are frequently in the form of discs of dielectric material having two plane surfaces bounded by an edge surface about the circumference.

Both plane surfaces of each of the members of dielectric material 10 and 11 are coated over with a conductive material such as silver or copper. These conductive films are referenced by the numerals 12 and 13 and 14 and 15, respectively.

This film of conductive material over both surfaces may be deposited thereon or secured thereto by any one of a number of well-known techniques which, since they form no part of this invention, will not be discussed in detail in this specification. The thin films are exaggerated in the drawings in the interest of clarity, as these films are in the order of .0005 inch thick.

The dielectric material of the member 10 is typically selected to be of a high dielectric constant in the range of 2500 to 4500, and low Q of approximately 30 at ten megacycles, such as a barium titante which has been properly doped or blended to achieve the required Q and $k$ values in the manner known to those skilled in the capacitor dielectric art. For example, $BaTiO_3$ blended or doped with other materials, the group of effective dopes or impurities including $SiO_2$, $TiO_2$, and $Al_2O_3$, may be employed for this dielectric material. As this is of high dielectric constant low Q material, this dielectric member with its conductive films 12 and 13 over respective surface areas thereof acts as the low-frequency by-pass portion of this dual by-pass capacitor.

The dielectric material of the member 11 is typically selected to be of a high Q of approximately 500 at one megacycle, and low dielectric constant in the range of 700 to 1100, such as a barium titanate material which has been properly doped or blended as described above, in which the Q factor does not deteriorate significantly with increases in signal frequencies through the VHF and UHF regions. This dielectric member with its conductive films 14 and 15 over respective surface areas thereof acts as the high-frequency by-pass portion of the capacitor unit of this dual by-pass unit.

The dielectric material members 10 and 11 are placed in a stacked relationship whereby one conductive surface of each lies adjacent to one conductive surface of the other, as shown in FIGURES 1 and 4.

Extending between and electrically connected to both adjacent plane surfaces of the members 10 and 11 is a signal lead 20. To reduce the inductive reactance of this lead, it may be of a ribbon type or foil type conductor, as indicated in the drawings. However, it is to be specifically understood that other cross section geometries may be employed for this lead without departing from the spirit of this invention.

A second electrical conductor 25 is connected to the opposite plane surfaces of both said members, as shown in FIGURES 1 and 4. The method of doing this is not important, it being only necessary that this conductor be electrically connected to both opposite conductive surfaces of the members 10 and 11 as indicated.

With this arrangement, and with the conductor 25 being the ground conductor, a very fine electrical shield is provided for the signal lead 20 of the dual by-pass capacitor of this invention. As with the lead 20, to reduce the inductive reactance of this lead, it is shown to be of a flat ribbon-like configuration and may be of foil or similar shape of conductive material. However, it is to be specifically understood that other cross sectional geometry may be employed without departing from the spirit of the invention.

It was found that a practical unit of this invention, with the dielectric members 10 and 11 each of a dimension of approximately $11/32$ of an inch square placed in a stacked relationship as shown, provided a unit approximately $5/64$ of an inch thick having a capacitance of .01 microfarad in the low-frequency unit and a capacity of .002 microfarad for the high-frequency unit.

The impedance of this unit, as determined by an RF bridge, was the vectorial sum of 0.2 plus $j0.2$ ohm, whereas the magnitude of impedance of a standard .01 microfarad disc ceramic capacitor at a frequency of 240 megacycles is approximately 18 ohms. Therefore, it is noted that a considerable improvement is realized with a dual by-pass capacitor unit of this invention.

In the configuration set forth in the drawing, the leads are parallel; therefore this unit lends itself to printed circuit assembly. For this application, the dielectric should be of rectangular form to reduce lead lengths. After assembly, the unit is coated with a protective insulating material.

While a preferred embodiment of the present invention has been shown and described, it will be obvious to those skilled in the art that various modifications and substitutions may be made without departing from the spirit of the invention, which is to be limited only within the scope of the appended claim.

What is claimed is:

A dual by-pass capacitor unit comprising:
(a) a first member of dielectric material having a dielectric constant of a range of 2500 to 4500 and a Q factor of approximately 30 at 10 megacycles, the first dielectric member having a first pair of parallel plane surface areas with a film of conductive material over both plane surfaces thereof, the first pair of parallel plane surface areas having an upper and a lower edge;
(b) a second member of dielectric material having a dielectric constant of a range of 700 to 1100 and a Q factor of approximately 500 at a frequency of one megacycle the second pair of parallel plane surface areas with a film of conductive material over both surfaces thereof, the second pair of parallel plane surface areas having an upper and a lower edge, the second pair of plane surface areas being of substantially the same surface area as the first pair of parallel plane surface areas and positioned in stacked alignment with said first pair of parallel plane surface areas;
(c) a first electrical conductor having a flat, straight portion extending between and electrically connected to the adjacent conductive surfaces of the two inner plane surface areas; and
(d) a second electrical conductor including
  (1) a first flat, straight leg electrically connected to the conductive surface of one outer plane surface area and extending in abutting relationship along said conductive surface from a point intermediate the lower and upper edges of said surface area past the upper edge of said surface area,
  (2) a second flat, straight leg in alignment with said first leg and electrically connected to the conductive surface of the other outer plane surface area and extending in abutting relationship along the entire length of said conductive surface from a point beyond the lower edge of said surface area past the upper edge of said surface area, and
  (3) a third leg extending above the upper edges of the dielectric members and joining the first and second straight legs.

References Cited by the Examiner

UNITED STATES PATENTS

| | | | |
|---|---|---|---|
| 2,694,185 | 11/1954 | Kodama | 330—70 |
| 3,042,846 | 7/1962 | Lawson | 317—256 |

ROBERT K. SCHAEFER, *Primary Examiner.*

JOHN F. BURNS, *Examiner.*

E. GOLDBERG, *Assistant Examiner.*